United States Patent

Chandross et al.

[11] 3,998,993
[45] Dec. 21, 1976

[54] ELECTRICAL DEVICE HAVING A METAL SURFACE BEARING A CORROSION INHIBITOR

[75] Inventors: Edwin Arthur Chandross, Berkeley Heights; Coralie Anne Pryde, Morristown, both of N.J.

[73] Assignee: Bell Telephone Laboratories, Incorporated, Murray Hill, N.J.

[22] Filed: June 9, 1975

[21] Appl. No.: 584,869

[52] U.S. Cl. .......................... 428/461; 148/6.14 R; 148/31.5; 252/180; 427/58; 428/470
[51] Int. Cl.² .................. B32B 15/08; B32B 27/00
[58] Field of Search ............................ 427/118, 58; 148/6.14 R, 31.5; 21/2.7 R, 2.5 R; 428/461, 470; 252/175, 180

[56] References Cited

UNITED STATES PATENTS

| | | | |
|---|---|---|---|
| 3,578,589 | 5/1971 | Hwa | 252/180 |
| 3,716,421 | 2/1973 | Burkhart | 148/6.14 R |

*Primary Examiner*—Ralph S. Kendall
*Assistant Examiner*—Edith R. Buffalow
*Attorney, Agent, or Firm*—Edward M. Fink

[57] ABSTRACT

Electrical device having a metal surface to at least a portion of which electrical connections are to be made by soldering, and having a coating on said portion which protects it against surface alteration which would tend to render such soldering more difficult but through which coating soldering can be effected, said coating comprising a polymer of at least one methacrylate of the general formula

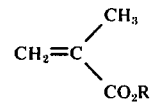

wherein R is selected from the group comprising alkyl radicals having from 1–6 carbon atoms and a glycidyl radical.

3 Claims, 1 Drawing Figure

U.S. Patent
Dec. 21, 1976
3,998,993
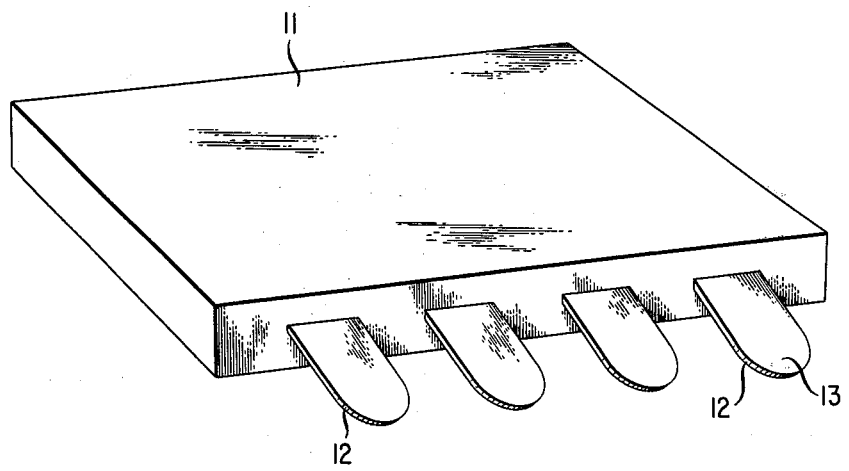

ELECTRICAL DEVICE HAVING A METAL SURFACE BEARING A CORROSION INHIBITOR

This invention relates to a technique for retarding corrosion of metal surfaces. More particularly, the present invention relates to a technique for retarding corrosion of copper and copper alloy surfaces by deposition thereon of a thin film of a methacrylate polymer.

The corrosion of metal surfaces has been a matter of concern to the electronics industry for many years. Unfortunately, the metals most commonly employed in electronic applications, namely, copper and its alloys, tend toward instability under the influence of heat and moisture, so resulting in the formation of an unattractive and unevenly oxidized surface. Furthermore, oxides so formed enhance the difficulties encountered in making acceptable solder connections to the metal surfaces.

In the past, a wide variety of chemical compositions have been used as ambient atmosphere protectants for such metals. The majority of those compositions have been found unsatisfactory for even short periods of exposure and, thus, not suited for the relatively long exposures required for many conventional applications. Accordingly, the most commonly used procedure for effecting the desired end has involved plating the metal surfaces with either a noble metal or solder, neither procedure having proven ideal.

More recently, a technique for obviating such limitations was described wherein a thin coating of a siloxane prepolymer formed by hydrolysis and partial condensation of an acylated aminoalkyltrialkoxysilane was deposited upon the metal surface of interest. The coating so deposited was found to effectively retard corrosion while maintaining satisfactory solderability characteristics. Although this system appears to evidence merit, workers in the art have continued their search for suitable alternatives.

In accordance with the present invention, this end is attained by the use of a member of a series of organic polymers. Briefly, the inventive technique involves depositing a thin coating of a methacrylate homopolymer or copolymer upon the metal surface of interest, which polymer need not be removed prior to soldering. Studies have revealed that coatings so deposited can effectively protect clean copper and alloys thereof from atmospheric corrosion without adversely affecting solderability. Although these films, standing alone, cannot always protect the copper from tarnishing induced by contaminants present on the surface before coating or introduced during the coating procedure, it has been found that such limitations can be effectively obviated by rinsing the surface to be coated with an aqueous solution of benzotriazole prior to coating. The combination of the methacrylate polymer and benzotriazole rinse has been found to yield a synergistic effect and hence the rinse is considered critical.

The invention will be more readily understood by reference to the accompanying drawing wherein:

The FIGURE is a perspective view of a typical electrical component having copper surfaces destined for subsequent soldering.

With reference now more particularly to the FIGURE, there is shown an encapsulated component 11 including a plurality of copper containing fingers 12 destined for soldering. Shown deposited upon the surface of fingers 12 is a thin coating 13 of the polymer described herein.

As noted, the polymer described is formed by polymerizing a methacrylate monomer or mixture of at least two methacrylate monomers. The methacrylates employed in the practice of the present invention are of the general formula

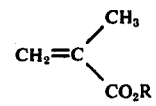

wherein R is selected from the group consisting of (a) alkyl radicals of the general formula $C_nH_{2n+1}$ wherein $n$ is an integer from 1–6, and (b) glycidyl radicals of the formula

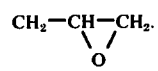

The methacrylate employed herein may be polymerized alone or in combination with other methacrylates by any well known procedure. A convenient technique for achieving this end involves dissolving the monomers of interest in a suitable solvent and bringing the resultant solution to reflux in the presence of an inert gas. Then, a polymerization initiator is added to the solution and refluxing continued. The solution may then be added to a suitable solvent from which the desired polymer precipitates upon cooling. Studies have revealed that the polymers of interest may comprise mixtures of any members of the recited group in varying proportions dependent upon the desired hardness and relative flexibility desired. However, the glycidyl methacrylate is employed in amounts ranging up to 10 percent, by weight, based on the weight of the polymer, such limit being dictated by crosslinking considerations beyond that point, which make the film too stable to solder under the mild soldering conditions employed.

As indicated, the invention comtemplates coating metal surfaces selected from among copper and alloys thereof, the materials most commonly employed in the fabrication of electronic components. Prior to coating the surface of interest, a conventional cleansing technique is employed for the purpose of removing surface contaminants. Following, the cleansed surface is rinsed in water and either immediately placed in ethanol if the benzotriazole treatment is not to be used, or placed for two to five minutes in an aqueous solution of benzotriazole, then rinsed and stored in ethanol. When the sample is to be coated, the ethanol is removed and the sample dip-coated in the polymer solution, air-dried and heated to a temperature within the range of 85° to 115° C for a time period ranging from 15–30 minutes, the lower temperature corresponding with the longer time period, thereby resulting in effective adherence of the polymer to the metal surface. Although the temperature range is not absolute, it will be understood that the use of temperatures appreciably in excess of 115° C may result in thermal oxidation of the surface whereas temperatures less than 85° C may not result in effecting adhesion of the polymer film to the metal surface. The thickness of the coating so deposited is considered critical, a practical range of thickness being within the range of 1–2 microns. After coating, testing may be implemented to evaluate retardation of oxidative degradation and degradation occurring under conditions normally encountered during storage prior to soldering operations.

The following exemplary embodiments serve to illustrate the invention but are not intended to limit it thereto.

EXAMPLE 1

Eight grams (0.08 mole) of methyl methacrylate 2 grams (0.014 mole) of glycidyl methacrylate and 10 grams (0.07 mole) of butyl methacrylate were dissolved in a mixture comprising 80 milliliters of benzene and 20 milliliters of toluene. The resultant solution was brought to reflux in a nitrogen ambient and 150 milligrams of benzoyl peroxide in 15 milliliters of benzene was added thereto. After 3 hours, 100 milligrams of benzoyl peroxide was added to the mixture and refluxing continued for an additional 3 hours. Then, the solution was poured into hot, stirred hexane and upon cooling the desired methacrylate copolymer precipitated as a soft, glassy solid from the solvent was decanted. The resultant polymer was then dissolved in warm methylene chloride and the precipitation in hexane repeated. Following decantation, the polymer was maintained under vacuum overnight at a temperature within a range of 40°–45° C to remove the last traces of solvent. Fifteen grams of dry solid methacrylate copolymer was obtained.

EXAMPLE 2

The procedure of example 1 was repeated with the exception that the glydicyl methacrylate was eliminated from the mixture. Fourteen grams of dry solid methacrylate copolymer was obtained.

The polymers so obtained are soluble in organic solvents, as for example, halogenated hydrocarbons such as trichloroethylene, dichloroethane and the like. Following recovery, the polymers are dissolved in a solvent in an amount sufficient to yield films of the desired thickness.

Aging tests were conducted using oxygen-free high-conductivity copper strips. The strips were initially cleaned by dipping in a 1:1 mixture of nitric acid and water containing a trace of chloride ion which leaves a lustrous surface. Following cleaning, the copper strips were rinsed in running tap water and placed either in ethanol for storage until use or in a benzotriazole solution containing from 150–300 milligrams per 100 milliliters of distilled water. A dip in the benzotriazole solution for 2–5 minutes at 20° C is sufficient to provide adequate protection for samples subsequently coated with the polymer. Following the benzotriazole rinse, the strips were given an aqueous rinse and stored in ethanol until ready for coating.

Immediately before coating, the samples were removed from the ethanol and blown dry with a stream of nitrogen. Following, the surface is dip-coated in the polymer solution, held vertically to drain and after evaporation of the majority of the solvent heated to a temperature within the range of 85°–115° C for a time period ranging from 30–15 minutes, the shorter periods corresponding with the higher temperatures. As indicated, the temperature range is not absolute. However, temperatures appreciably beyond the 115° C maximum tend to cause degradation of the polymer film.

Solderability tests were performed in the following manner. After dipping in water — white rosin in isopropyl alcohol, the surfaces were immersed for ten seconds in solder at 236° C.

Additionally, accelerated aging conditions were employed to test the treated samples using (a) dry heat at 80°–90° C and ambient humidity, (b) humid atmosphere (38° C and 100 percent humidity), and (c) humid atmosphere (40°–42° C, 100 percent relative humidity) in an ambient saturated with elemental sulfur.

Other tests conducted included sodium chloride, polysulfide and amine tests, the samples being inspected visually for evidence of tarnishing at the conclusion of the test.

Studies of the results obtained from the foregoing tests revealed that samples protected in the described manner evidenced excellent aging characteristics and good solderability after several weeks in the sulfur-100 percent relative humidity ambient. Additionally, the samples protected as described were found to be very resistant to attack by sodium chloride. Studies also revealed that benzotriazole treatments alone did not yield satisfactory results but that the synergistic combination of methacrylate polymer and benzotriazole resulted in a marked enhancement in retention of solderability. Additionally, the methacrylate polymers alone yield erratic results.

What is claimed is:

1. Electrical device having a metal surface selected from the group consisting of copper and its alloys to at least a portion of which electrical connections are to be made by soldering, and having a coating on said portion which protects it against surface deterioration which would tend to render such soldering more difficult but through which coating soldering can be effected, said coating comprising successively a surface film of a benzotriazole-copper complex and a layer of a polymer selected from the group consisting of
    a. homopolymers formed by polymerization of a methacrylate monomer of the general formula

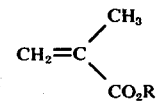

wherein R is selected from the group consisting of alkyl radicals of the general formula $C_nH_{2n+1}$ wherein $n$ is an integer from 1–6, and
    b. copolymers formed by copolymerization of at least one methacrylate monomer of said general formula wherein R is selected from the group consisting of alkyl radicals of the general formula $C_nH_{2n+1}$ wherein $n$ is an integer from 1–6, and a glycidyl radical, the said glycidyl monomer being present in said copolymer in an amount ranging up to 10 percent, by weight.

2. Device in accordance with claim 1 wherein said layer comprises a copolymer of methyl methacrylate and butyl methacrylate.

3. Device in accordance with claim 2 wherein said layer further comprises up to 10 percent, by weight, glycidyl methacrylate.

* * * * *